United States Patent
Harr et al.

(10) Patent No.: US 8,927,175 B2
(45) Date of Patent: Jan. 6, 2015

(54) PUMP AND FUEL CELL SYSTEM HAVING A PUMP

(75) Inventors: Oliver Harr, Reichenbach (DE); Andreas Knoop, Esslingen (DE); Cosimo S. Mazzotta, Ulm (DE); Patrick L. Padgett, Wilmington, NC (US); Hans-Joerg Schabel, Reutlingen (DE); Klaus Scherrbacher, Deggingen (DE)

(73) Assignee: Daimler AG, Stuttgart (DE)

( * ) Notice: Subject to any disclaimer, the term of this patent is extended or adjusted under 35 U.S.C. 154(b) by 1280 days.

(21) Appl. No.: 12/680,161

(22) PCT Filed: Jul. 23, 2008

(86) PCT No.: PCT/EP2008/006033
§ 371 (c)(1),
(2), (4) Date: Sep. 20, 2010

(87) PCT Pub. No.: WO2009/039909
PCT Pub. Date: Apr. 2, 2009

(65) Prior Publication Data
US 2011/0003238 A1    Jan. 6, 2011

(30) Foreign Application Priority Data
Sep. 26, 2007 (DE) .......................... 10 2007 046 014

(51) Int. Cl.
*H01M 8/04* (2006.01)
*F04D 29/08* (2006.01)
*F04D 23/00* (2006.01)
*F04D 29/16* (2006.01)

(52) U.S. Cl.
CPC ......... *F04D 29/083* (2013.01); *H01M 8/04186* (2013.01); *Y02E 60/50* (2013.01); *F04D 23/008* (2013.01); *F04D 29/161* (2013.01)
USPC ........... 429/512; 429/443; 429/513; 415/229; 415/230

(58) Field of Classification Search
CPC ... F04D 23/008; F04D 29/083; F04D 29/161; F04D 29/106; Y02E 60/50; H01M 8/04186
USPC .................. 429/443, 512, 513; 415/229, 230
See application file for complete search history.

(56) References Cited

U.S. PATENT DOCUMENTS

| 4,801,244 | A | 1/1989 | Stahl |
| 7,354,669 | B2 | 4/2008 | Hobmeyr et al. |
| 2004/0219401 | A1* | 11/2004 | Hobmeyr et al. ............... 429/13 |

FOREIGN PATENT DOCUMENTS

| CH | 487 656 | 12/1929 |
| DE | 134440 | 10/1929 |

(Continued)

OTHER PUBLICATIONS

Transmittal and International Search Report and Written Opinion dated Oct. 17, 2008 (19 pages).

*Primary Examiner* — Patrick Ryan
*Assistant Examiner* — Ben Lewis
(74) *Attorney, Agent, or Firm* — Crowell & Moring LLP

(57) ABSTRACT

A pump has a shaft, an impeller arranged on the shaft, and a labyrinth seal which is arranged between stationary and moving parts of the pump. A plurality of blades are arranged on the rotor and a labyrinth seal extends at least between the shaft and a rear portion of the blades. A gap in the labyrinth seal is designed such that liquid water can be actively carried away, with the labyrinth seal for this purpose being designed at least in places with a channel in the form of a spiral and/or a staircase. The invention also relates to a fuel cell system having such a pump.

15 Claims, 3 Drawing Sheets

(56) References Cited

FOREIGN PATENT DOCUMENTS

| | | | |
|---|---|---|---|
| DE | 42 43 544 A1 | 6/1994 | |
| DE | 199 21 765 A1 | 11/2000 | |
| DE | WO00/68577 | * 11/2000 | ............. F04D 23/00 |
| DE | 103 14 820 A1 | 12/2004 | |
| GB | 630483 | 1/1947 | |

* cited by examiner

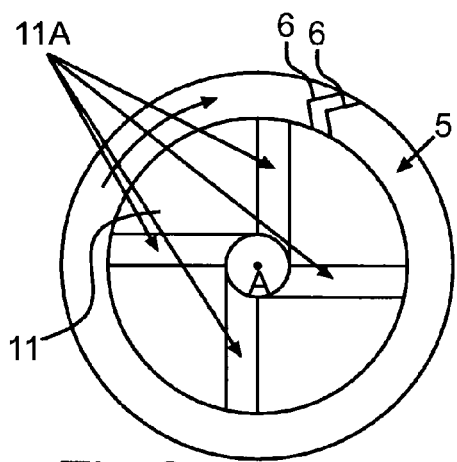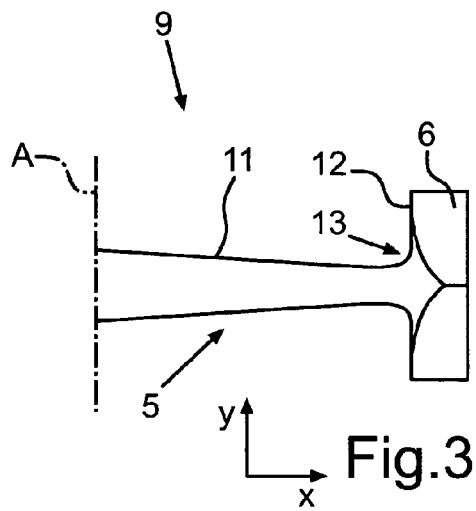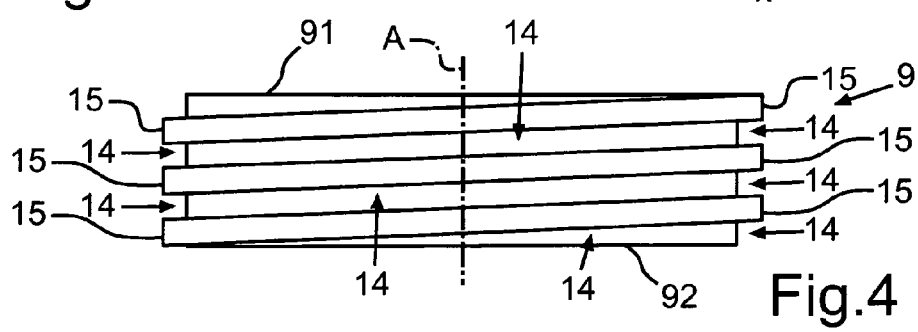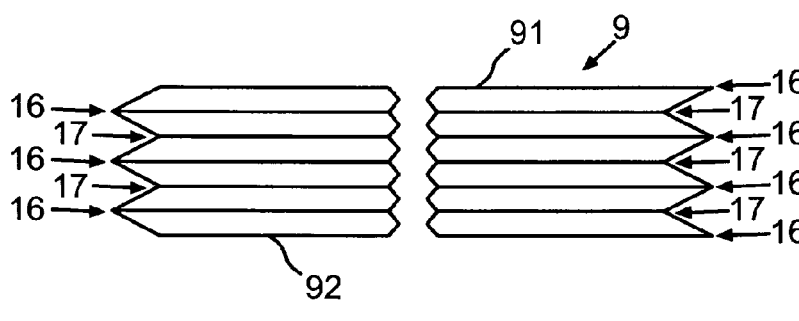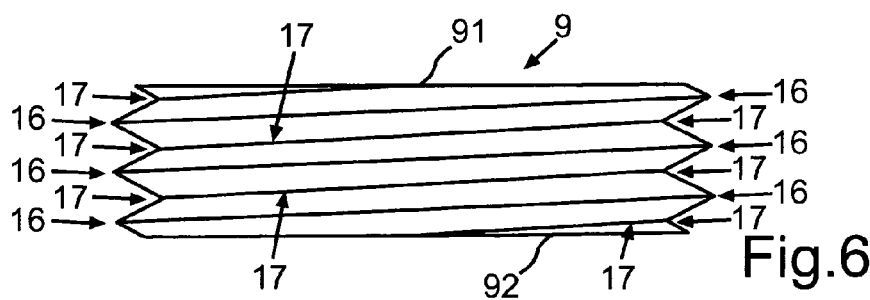

PUMP AND FUEL CELL SYSTEM HAVING A PUMP

This application is a national stage of PCT International Application No. PCT/EP2008/006033, filed Jul. 23, 2008, which claims priority under 35 U.S.C. §119 to German Patent Application No. 10 2007 046 014.9, filed Sep. 26, 2009, the entire disclosure of which is herein expressly incorporated by reference.

BACKGROUND AND SUMMARY OF THE INVENTION

The invention relates to a pump having a shaft, an impeller arranged on the shaft, and a labyrinth seal arranged between stationary and moving parts of the pump. The invention also relates to a fuel cell system having a pump such as this.

Swiss patent document CH 134 440 discloses a labyrinth seal between stationary and moving parts of a pump. The labyrinth seal has pointed spurs which are separated by a minimal gap and are arranged in the direction of a disk which is mounted on the shaft. The tips of the labyrinth seal are therefore arranged essentially parallel to the axis of the shaft.

Furthermore, German patent document DE 103 14 820 A1 discloses a method for preventing water from freezing in the anode circuit of a fuel cell system, as well as a fuel cell system. The fuel cell system has a recirculation pump which may be in the form of a side-channel compressor. This has a shaft and an impeller, which is arranged on the shaft and has a plurality of blades.

An impeller area which is formed between the shaft and a blade rear is in the form of a cavity which is closed at the top by a pump housing. The blade rear facing the shaft is formed without any corners and opens, in particular in the form of a curve, into the surface of the impeller.

In an entirely general form, side-channel compressors such as these are formed with an impeller such that there is a relatively small space between the moving components and the stationary components. This is used as a closure or seal during operation of the pump, and improves the pump efficiency. If the pump is designed to feed gases, then, in particular, a problem can occur as a result of these intermediate spaces during starting of the pump, if liquid enters these intermediate spaces when the pump is deactivated. For example, this liquid may be condensation which is formed when the pump is in the deactivated state. Furthermore, if the pump is used in environmental conditions which are characterized by relatively low temperatures, in particular close to or below the freezing point of water, then the pump can freeze. In this case, the movable parts of the pump can be frozen to the stationary parts by the freezing water in the intermediate space. This can make it impossible to start the pump, or at least make it very difficult. The increase in the volume of the freezing water can likewise result in damage to components of the pump.

One object of the present invention, therefore, is to provide a pump (and a fuel cell system having such a pump) in which it is possible to prevent liquid from accumulating in the area of the pump impeller. One particular aim is to prevent the impeller from freezing to the labyrinth seal, and therefore also to stationary parts of the pump.

This and other objects and advantages are achieved by the pump according to the invention, which has a shaft and an impeller arranged thereon. Furthermore, the pump has a labyrinth seal which is arranged between stationary and moving parts of the pump. In particular, the labyrinth seal is arranged fixed to a housing of the pump, and is positioned in the immediate vicinity of the impeller. A plurality of blades are arranged on the impeller, with the labyrinth seal, which extends at least between the shaft and a blade rear of the blades, having a channel which extends in a helical shape.

A refinement such as this in particular to the channel of the labyrinth seal allows the water accumulating in the area of the impeller to be reliably carried away out of the intermediate spaces between the labyrinth seal and the impeller. The helical extent of the channel ensures that the water is transported away in a particularly effective and efficient manner. Water residues in the area of the impeller can therefore be virtually completely prevented. This also makes it possible to prevent the impeller from freezing hard on the labyrinth seal at low environmental temperatures, avoiding the problems in starting the pump. Not least, this also makes it possible to prevent water freezing in the area of the impeller and of the labyrinth seal expanding and leading to damage to components of the pump, in particular of the impeller and of the labyrinth seal.

At least one channel of the labyrinth seal is preferably formed on the casing side of the labyrinth seal. The impeller is preferably in the form of a disc, and the labyrinth seal has an annular shape. Since this annular structure has a certain height this therefore also forms a casing surface, in which case the water can be effectively transported away by this relatively external configuration of the channel in the labyrinth seal.

It is particularly advantageous for the pump to be in the form of a side-channel compressor and to have at least one side channel in which the water can then be transported away. The channel in the labyrinth seal thus preferably leads into at least one side channel of the pump. The pump preferably has an upper and a lower side channel.

It is particularly advantageous to consider the channel in the labyrinth seal to be in the form, in its longitudinal extent, of a channel which is open at the side in the casing side of the labyrinth seal, and for the blade rears to form a channel wall once the labyrinth seal has been inserted into the pump.

The channel in the labyrinth seal is preferably formed with an essentially constant radius and in particular is designed to be circumferential around the axis of the shaft.

In particular, the channel of the labyrinth seal is designed to complete at least two revolutions around the shaft axis. The channel may, of course, also have a plurality of helical turns.

Those areas of the labyrinth seal which face the blade rear are preferably tapered. In particular, those areas which face the blade rear are in the form of points.

A refinement such as this minimizes the area of the labyrinth seal which is arranged immediately adjacent to the wall of the blade rear. This makes it possible to implement refinements in which as little surface area as possible is created on which water can accumulate, and freeze firmly there, in the intermediate space between the labyrinth seal and the blade rear.

In particular, a pointed refinement such as this of subareas of the casing surface of the labyrinth seal makes it possible for the channel in the labyrinth seal to have a triangular cross section.

It should be noted that the channel in the labyrinth seal results in a channel whose cross section is not completely closed. This is because the casing surface, or the side of the labyrinth seal facing the blade rear, is not intended to rest directly on this blade rear. A minimal gap is provided between the wall of the blade rear and the casing side of the labyrinth seal. However, this formation of an intermediate space is in general sufficiently small that it cannot effectively be regarded as an outlet opening when the water is being transported away through the channel of the labyrinth seal. A negligible leakage of the water to be transported away therefore invariably occurs through this intermediate gap.

It is also possible for those areas of the labyrinth seal which face the blade rear to be flat. In a refinement such as this, there are therefore larger areas of the casing side opposite the labyrinth seal and the surface of the blade rear.

In a refinement such as this, the channel of the labyrinth seal is preferably designed to have a quadrilateral cross section.

That surface of the impeller which faces the labyrinth seal is preferably structured at least in places with a roughness which is greater than that of a further surface of the impeller. A rough impeller surface such as this can be achieved by allowing liquid droplets to flow into the depressions in the structuring, at least in places, thus making it possible to keep the height of these water droplets projecting above the surface of the impeller small. Furthermore, such rough structuring with relatively small depressions makes it possible to enlarge the surface area, as a result of which the remaining liquid droplets once again also remain in the depressions of a relatively large surface area, because of their surface tension. This refinement as well makes it possible to reduce the probability of movable parts freezing firmly to stationary parts in the pump since, even if the water droplets remain in the pump, they are relatively flat.

That surface of the impeller which faces the labyrinth seal is preferably coated, at least in places, with a metal layer which has greater roughness than a further surface of the rotor. In particular, a sprayed-on metal layer coating can be provided. This particularly effectively ensures the advantages already mentioned above with regard to reducing the height of liquid droplets. Furthermore, a metal layer such as this is also subject to little wear.

That side of the labyrinth seal which faces the impeller is preferably structured at least in places with a greater roughness than a further surface of the labyrinth seal. This also makes it possible to take positive account of the advantages mentioned above with regard to the liquid distribution.

The surface of the labyrinth seal is advantageously coated at least in places with a hydrophobic material. In consequence, the cohesion forces of a liquid are a primary factor, in comparison to other forces. In particular, areas of the labyrinth seal which taper at the side or are even pointed, and which face the blade rear, make it possible to ensure that the liquid which still remains automatically runs away from these points and runs into the interior or the troughs of the channel. A hydrophobic coating such as this therefore automatically makes it possible for the remaining water to move away into the interior of the channel, from the intermediate space between the labyrinth seal and the blade rear.

Once again, this therefore makes it possible to reduce the amount of water located directly in the space between the labyrinth seal and the blade rear, and therefore to avoid the possibility of firm freezing.

Furthermore, the hydrophobic coating in the case of a channel with a helical shape, in particular in conjunction with pointed outer faces, makes it possible to reduce the adhesion, and the friction of the hydrophobic material allows the liquid to flow away out of the intermediate space, just by gravitational forces.

The impeller, which is in the form of a disc, is preferably designed such that its cross section tapers in the direction of the blade rear. The upper face of the impeller preferably runs such that it falls in the direction of the blade rear. A refinement such as this therefore also makes it possible to assist the process of the liquid which is accumulated in the area of the impeller flying away in the outward direction toward the blade rear.

It has been found to be particularly preferable for the junction between the surface of the impeller and the blade rear to be formed without corners. In this case, a continuous curvature is preferably provided. Once again, and in conjunction with the helical channel in the labyrinth seal, this makes it possible to positively influence the process of transporting water away.

A further aspect of the invention relates to a pump having a shaft and an impeller which is arranged on the shaft, and having a labyrinth seal which is arranged between stationary and moving parts of the pump. A plurality of blades are arranged on the impeller, and a blade rear of the blades and a side facing the blade rear, of the labyrinth seal, which extends at least between the shaft and the blade rear, are formed at an angle to the rotation axis of the impeller, and the side which faces the blade rear, of the labyrinth seal, and/or the blade rear are/is stepped at least in places in order to form a stepped channel extending between them.

A refinement such as this, in particular of the channel in the labyrinth seal, makes it possible for water which has accumulated in the area of the impeller to be reliably carried away from the spaces between the labyrinth seal and the impeller. The stepped extent of the channel makes it possible to ensure that the water is transported away particularly effectively and efficiently. Water residues in the area of the impeller can therefore be virtually completely avoided. In consequence, it is also possible to prevent the impeller from freezing firmly on the labyrinth seal at low environmental temperatures, and to avoid pump starting problems. Not least, this also makes it possible to avoid water which is freezing in the area of the impeller and of the labyrinth seal expanding and leading to damage to components of the pump, in particular of the impeller and of the labyrinth seal.

The inclination of the side of the labyrinth seal and/or of the blade rear with respect to the rotation axis of the impeller is preferably at an angle of greater than 0 and less than 90 degrees. This allows the water to be driven out particularly effectively. It is also possible to provide an angle of greater than 0 and less than 180 degrees.

The channel is preferably in the form of a staircase. The water can be driven outwards with the aid of the centrifugal force when the impeller is rotating. The labyrinth seal is then no longer formed just with horizontally running sides. The angled arrangement mentioned above can then be used to produce a labyrinth gap which is in the form of a staircase and does not run vertically. The length of the gap and its geometry can in this case be lengthened and configured in many ways. In one optimum refinement, the gap losses, inter alia, are also minimized, and the effectiveness of the labyrinth seal is maximized.

The walls which form a step are preferably arranged at an angle of greater than 0 and less than 180 degrees to one another.

The pump according to the invention in the first aspect, or an advantageous embodiment of it, can also be combined with the pump according to the invention of the second aspect, or an advantageous embodiment thereof.

In an entirely general form, in the case of the two aspects of the pumps according to the invention, the gap in the labyrinth seal, in particular, is designed such that liquid water can be actively carried away, in which case, for this purpose, the labyrinth seal is formed at least in places with a channel which is helical and/or in the form of a staircase, or forms at least a part of the channel.

A further aspect of the invention relates to a fuel cell system having at least one fuel cell and one pump according to the invention, or an advantageous refinement thereof. The fuel cell system is preferably in the form of a mobile fuel cell system and, in particular, can be arranged in a motor vehicle.

In particular, a fuel cell in the fuel cell system is in the form of a PEM fuel cell.

The pump is preferably associated with the anode branch of the fuel cell. The pump is in this case preferably arranged in a recirculation circuit in the anode branch. The off-gas produced by the anode of the fuel cell is fed back via the recirculation circuit.

Other objects, advantages and novel features of the present invention will become apparent from the following detailed description of the invention when considered in conjunction with the accompanying drawings.

BRIEF DESCRIPTION OF THE DRAWINGS

FIG. 2 is a schematic plan view of the impeller for the pump as shown in FIG. 1;

FIG. 3 is a schematic longitudinal section illustration through the impeller shown in FIG. 2;

FIG. 4 is a schematic side view of a first exemplary embodiment of a labyrinth seal in the pump as shown in FIG. 1;

FIG. 5 is a schematic side view of a second exemplary embodiment of a labyrinth seal in the pump as shown in FIG. 1;

FIG. 6 is a schematic side view of a third exemplary embodiment of a labyrinth seal in the pump as shown in FIG. 1.

DETAILED DESCRIPTION OF THE DRAWINGS

Identical or functionally identical elements are provided with the same reference symbols in the figures.

Figure 1:
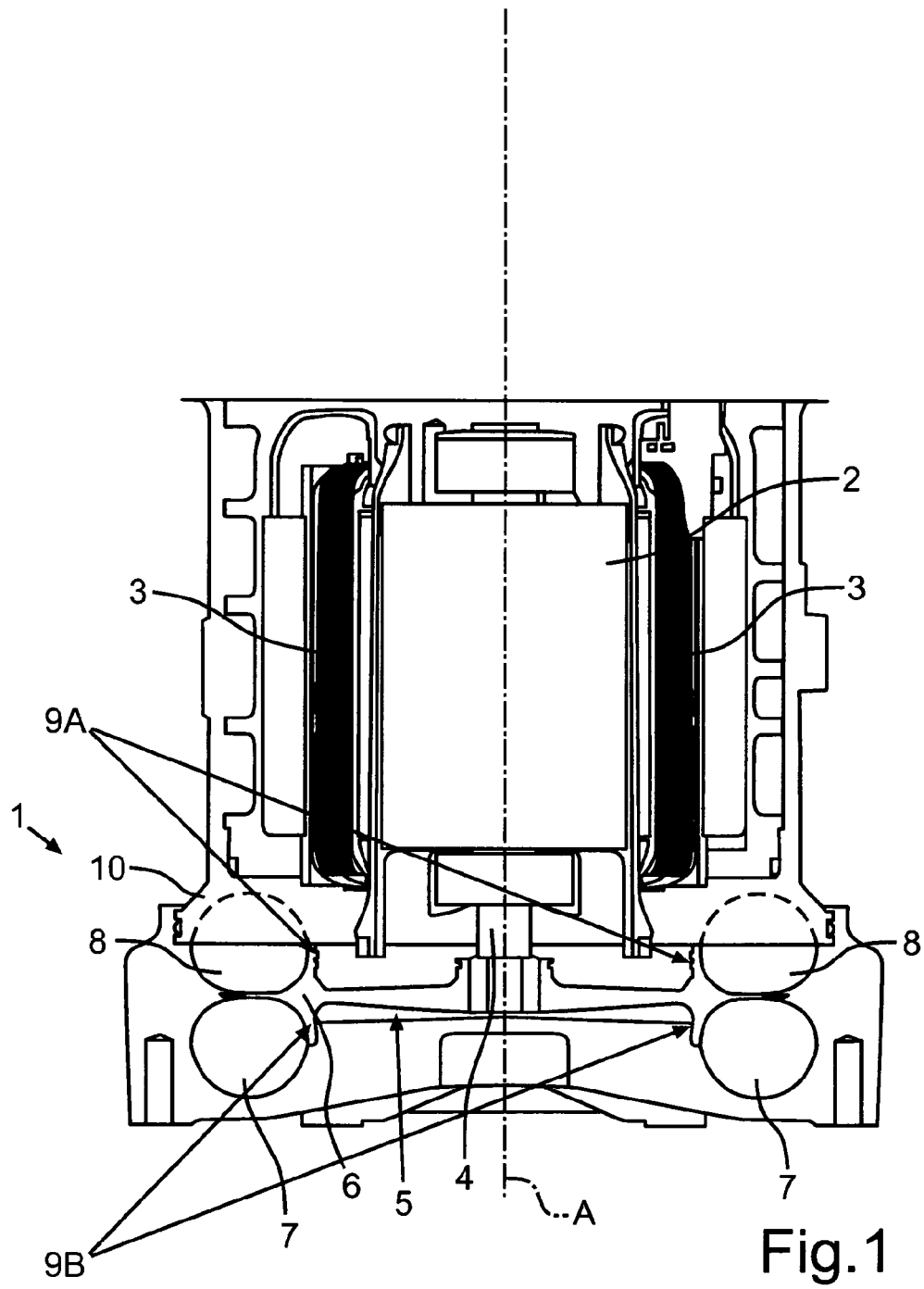
FIG. 1 shows a section through a subarea of a pump in the form of a side-channel compressor.

FIG. 1 is a partial section of a pump 1 in the form of a side-channel compressor. The pump 1 has an associated fuel cell system with at least one fuel cell which is arranged in a motor vehicle. The pump 1 is arranged in an anode branch in a fuel cell in the fuel cell system, where it is arranged in particular in a recirculation circuit for the anode branch. The pump 1 is therefore designed to feed hydrogen and/or gas containing hydrogen.

The pump 1 has a rotor 2 which is arranged in a motor area. A stator 3 is also arranged in the motor area, and is positioned fixed to the housing. The rotor 2 is mounted on a shaft 4, on which an impeller 5 of the pump 1 is also mounted. The impeller 5 in the exemplary embodiment is in the form of a disk on whose circumference a plurality of blades 6 are arranged. The impeller 5 together with the blades 6 is driven via the shaft 4, and rotates about the axis A of the shaft 4.

A lower side channel 7 and an upper side channel 8 are formed adjacent to the blades 6.

Furthermore, the pump 1 has a labyrinth seal 9A and 9B, which is arranged adjacent to the upper faces 11 (FIG. 2) of the impeller 5. The labyrinth seal 9A and 9B extends between the shaft 4 and that area of the impeller 5 which faces the shaft 4, and a blade rear 12 (FIG. 3). The labyrinth seal 9A and 9B is arranged separately from the impeller 5, and is positioned fixed to a housing 10. It therefore represents a stationary component of the pump 1. The impeller 5 can move relative to the labyrinth seal 9A and 9B.

The labyrinth seal 9A and 9B, which is illustrated only schematically in FIG. 1, will be explained in more detail in the following text, together with its specific configuration.

FIG. 2 is a plan view of a schematic illustration of the impeller 5. The angled blades 6 are arranged externally on the impeller 5, which is in the form of a disc, although only two of these blades 6 are illustrated, by way of example. The direction of the arrow indicates the rotation direction of the disk or of the impeller 5.

Radially running projections 11A are preferably formed on at least one of the upper faces 11 and potentially feed water located between the housing and the impeller 5 in the direction of the labyrinth seal 9A, 9B.

FIG. 3 is a schematic longitudinal section illustration, showing a partial detail of the illustration shown in FIG. 1. The impeller 5 comprises the body which is in the form of a disk and is designed to taper from the rotation axis A of the impeller 5 in the direction of the blades 6. In particular, the upper face 11 of the impeller 5 is designed such that it is inclined downwards in comparison to the horizontal, in the direction of the blade rear 12. A junction 13 between the blade rear 12 and the upper face 11 is formed without any steps or corners and, as can be seen from the illustration in FIG. 3, is characterized by a continuously curved profile. The labyrinth seal 9A, 9B is not shown, with its position just being indicated by the reference symbol.

This refinement of the impeller 5 on the upper faces 11 and the junction 13 allows the water which is formed in the small spaces between the impeller 5 and the labyrinth seal 9A, 9B to be passed easily and reliably into the area of the junction 13. From there, it can then be reliably transported out of the small intermediate spaces by means of the refinements of the labyrinth seal 9A, 9B which will be explained in the following text, and can be passed out into the side channels 7 and/or 8.

This makes it possible to prevent the accumulation of a relatively large amount of water between the impeller 5 and the labyrinth seal 9A, 9B, and therefore between stationary and moving parts of the pump 1. In consequence, it is also possible to prevent the impeller 5 from freezing firmly on the labyrinth seal 9A, 9B at low environmental temperatures.

It is preferably possible for the upper face 11 to be structured at least in places. In particular, a rough surface is formed here, thus making it possible for any residual water to lie in depressions, and to reduce the height of water droplets above the upper face 11.

A sprayed-on metal layer coating is preferably provided in this case.

FIG. 4 is a schematic side view of a first exemplary embodiment of a labyrinth seal 9A, 9B. The labyrinth seal 9A, 9B has a channel 14 which extends in a helical shape. In the exemplary embodiment, this channel 14 is formed in the casing surface of the annular labyrinth seal 9A, 9B. In particular, the channel 14 therefore represents a spiral groove. The channel 14 rises in a helical shape in the y direction and is formed such that it revolves at least twice completely around the axis A on the casing side of the labyrinth seal 9A, 9B. As can be seen from the illustration in FIG. 4, the channel 14 has a quadrilateral cross section, as can be seen, for example, on the left-hand and right-hand wall areas of the seal 9A, 9B. As can also be seen, this channel 14 in the labyrinth seal 9A, 9B is designed to be open on the outside in its longitudinal extent. On insertion into the pump 1, in the area of the impeller 5, the blade rear 12 then forms a fictitious closure for the channel 14. However, it should be noted that the channel 14 is not completely closed since a small space is formed between the blade rear 12 and the end areas 15 which represent an area of the casing side of the labyrinth seal 9A, 9B. The labyrinth seal 9A, 9B is mounted by its upper face 91 on the housing 10, with the lower face 92 facing the upper face 11 of the impeller 5.

In the exemplary embodiment illustrated in FIG. 4, the end areas 15 are essentially flat and are formed over a flat area which is opposite a flat area of the blade rear 12.

FIG. 5 is a further exemplary embodiment of a labyrinth seal 9A, 9B. In this embodiment, the end areas 16 are tapered, in particular running to a point. These pointed end areas 16 extend in the direction of the blade rear 12. Since the end areas 16 are pointed, only a minimal part of the casing side is still positioned directly opposite the blade rear 12, with a small intermediate space. This makes it possible to further reduce the accumulation of water in the intermediate space since only a small contact area is now formed. The channel 17 which is formed in the labyrinth seal 9A and 9B in this refinement has an essentially triangular cross section, with the channel 17 in this case as well being provided on the casing side of the labyrinth seal 9A, 9B and being opened towards the outside. In this case as well, the wall of the blade rear 12 effectively forms a side wall of the channel 17. The refinement of the labyrinth seal 9A and 9B as shown in FIG. 5 allows the cohesion forces to be promoted in comparison to other forces, and capillary forces to be minimized. The refinement shown in FIG. 5 makes it possible for liquid in the labyrinth seal 9A, 9B to move away from the pointed end areas 16 into the interior of the channel 17, which runs to a point, and therefore also to run away from the wall of the blade rear 12.

FIG. 6 is a schematic side view of a further exemplary embodiment of a labyrinth seal 9A, 9B. In this embodiment, the labyrinth seal 9A, 9B has a channel 17 which extends in a helical shape. The geometry and configuration correspond to those shown in FIG. 5. In this case as well, the end areas 16 run to a point, and the channel 17 has at least two complete revolutions around the axis A. In this case as well, the channel 17 rises in the y-direction. In particular, the labyrinth seal 9A, 9B essentially has a height (in the y-direction) which corresponds to the height of the blade rear 12.

The lower face 92, which faces the impeller 5, of the labyrinth seal 9A and 9B is preferably also structured at least in places, and therefore has a surface which is rough in comparison to other surfaces of the labyrinth seal 9A and 9B. It is also possible for those walls of the labyrinth seal 9A and 9B which bound the channel 14 and 17, respectively, to be structured in this way at least in places.

Furthermore, it is preferable for the labyrinth seal 9A and 9B to be coated with a hydrophobic material, at least in places.

Figure 7:
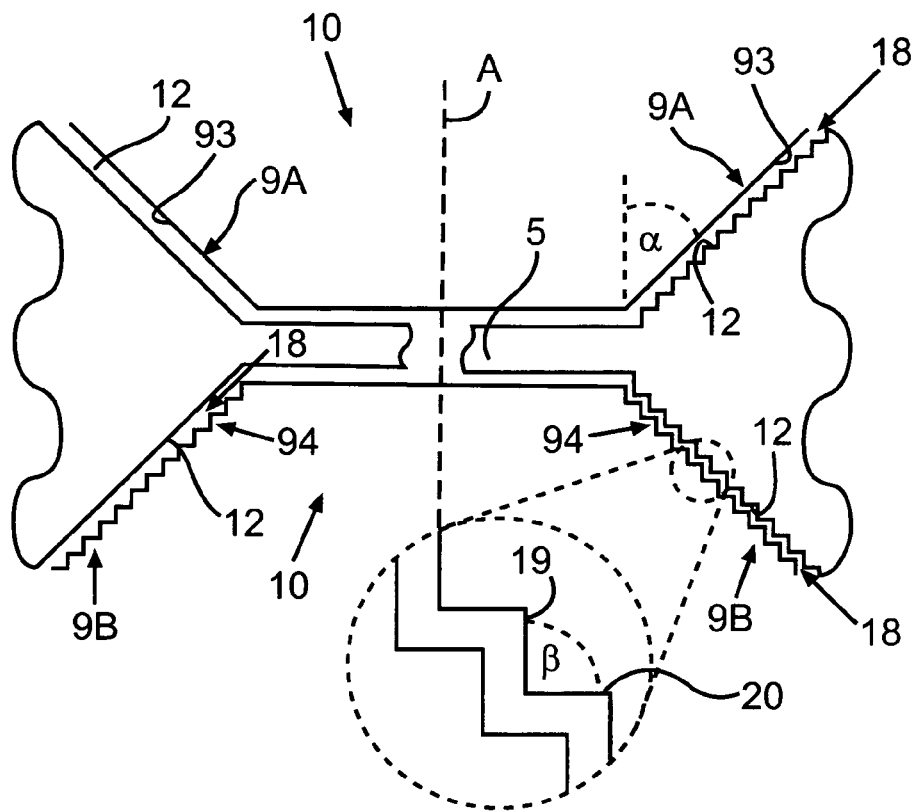
FIG. 7 is a section illustration of a partial detail of a further embodiment of a pump according to the invention.

FIG. 7 is a further exemplary embodiment of a pump 1, illustrated in the form of a schematic section, showing only the area between the impeller 5 and the housing 10 and the labyrinth seal 9A and 9B.

A plurality of blades 6 are arranged on the impeller 5. A blade rear 12 of the blades 6 and a side of the labyrinth seal 93, 94, facing the blade rear 12, of the respective labyrinth seal 9A and 9B which extends at least between the shaft 4 (FIG. 1) and the blade rear 12 are inclined with respect to the shaft axis or rotation axis A of the impeller 5. The blade rear 12 and/or that side 93, 94 of the labyrinth seal 9A or 9B, respectively, which faces the blade rear 12 are/is stepped at least in places in order to form a stepped channel 18 extending between them.

In the embodiment illustrated by way of example, only the blade rear 12 at the top on the right is stepped, and the side 93 of the labyrinth seal 9A is essentially smooth.

In the right-hand lower half of FIG. 7, both the side 94 and blade rear 12 are stepped.

In the exemplary embodiment on the left at the bottom, the blade rear is essentially smooth and the side 94 of the labyrinth seal 9B is stepped.

An angle which in the illustrated embodiment is greater than 0 and less than 90 degrees is formed between the axis A and the side 93 of the labyrinth seal 9A, and therefore of the blade rear 12 as well. A corresponding situation applies on both sides of the axis A and therefore also for the inclination of the side 94 with respect to the axis A. For comparison with a stepped embodiment, the embodiment of the side 93 and of the blade rear 12 which is smooth on both sides is shown on the left at the top.

The sides of the labyrinth seal 19 and 20 which form a step may have an angle $\beta$ of between greater than 0 and less than 180 degrees, with an angle of 90 degrees being shown in the exemplary embodiment.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE SYMBOLS

1 Pump
2 Rotor
3 Stator
4 Shaft
5 Impeller
6 Blades
7 Lower side channel
8 Upper side channel
9A, 9B Labyrinth seal
10 Housing
11 Upper face of the impeller
12 Blade rear
13 Junction
14, 17, 18 Channels
15, 16 End areas
19, 20 Sides of the labyrinth seal
91 Upper face
92 Lower face
93, 94 Sides of the labyrinth seal
A Axis

The invention claimed is:

1. A pump comprising:
a shaft;
an impeller arranged on the shaft; and
a labyrinth seal arranged between stationary and moving parts of the pump; wherein,
a plurality of blades are arranged on the impeller;
the labyrinth seal extends at least between the shaft and a rear portion of the blades;
the labyrinth seal has at least one channel which extends in a helical shape; and
at least portions of a surface of the impeller which faces the labyrinth seal is structured with a roughness which is greater than that on a further surface of the impeller.

2. The pump as claimed in claim 1, wherein the at least one channel is formed on a casing side of the labyrinth seal.

3. The pump as claimed in claim 2, wherein the at least one channel is formed circumferentially around an axis of the shaft, at substantially the same radius.

4. The pump as claimed in claim 1, wherein:
relative to considered its longitudinal direction, the at least one channel is open at a side, in a casing side of the labyrinth seal; and
in an installed state, in which the labyrinth seal has been inserted into the pump, the rear portions of the blades form a channel wall.

5. The pump as claimed in claim 1, wherein the at least one channel comprises at least two revolutions.

6. The pump as claimed in claim 1, wherein areas of the labyrinth seal which face the rear portion of the blades are tapered to a point.

7. The pump as claimed in claim 1, wherein areas of the labyrinth seal which face the rear portion of the blades are flat.

8. The pump as claimed in claim 1, wherein the at least portions of the surface of the impeller which faces the labyrinth seal are coated with a metal layer that has greater roughness than the further surface of the impeller.

9. A pump comprising:
a shaft;
an impeller arranged on the shaft; and
a labyrinth seal arranged between stationary and moving parts of the pump; wherein,
a plurality of blades are arranged on the impeller;
the labyrinth seal extends at least between the shaft and a rear portion of the blades;
the labyrinth seal has at least one channel which extends in a helical shape; and
at least portions of a side of the labyrinth seal which faces the impeller is structured with a greater roughness than a further surface of the labyrinth seal.

10. A pump comprising:
a shaft;
an impeller arranged on the shaft; and
a labyrinth seal arranged between stationary and moving parts of the pump; wherein,
a plurality of blades are arranged on the impeller;
the labyrinth seal extends at least between the shaft and a rear portion of the blades;
the labyrinth seal has at least one channel which extends in a helical shape; and
at least a portion of a surface of the labyrinth seal is coated with a hydrophobic material.

11. The pump as claimed in claim 1, wherein the impeller tapers in a direction of the rear portion of the blades.

12. The pump as claimed in claim 1, wherein a junction between the surface of the impeller and rear portion of the blades is formed without corners.

13. The pump as claimed in claim 1, wherein the pump comprises a side-channel compressor.

14. A fuel cell system having at least one fuel cell and one pump as claimed in claim 1.

15. The fuel cell system as claimed in claim 14, wherein the pump is associated with an anode branch of the fuel cell.

* * * * *